(12) United States Patent
Woenarta et al.

(10) Patent No.: US 11,697,316 B2
(45) Date of Patent: Jul. 11, 2023

(54) VIBRATION DAMPER AND MOTOR VEHICLE

(71) Applicants: thyssenkrupp AG, Essen (DE); ThyssenKrupp Bilstein GmbH, Ennepetal (DE)

(72) Inventors: Freddy Woenarta, Braunschweig (DE); Stefan Cytrynski, Stuttgart (DE); Matthias Römer, Holzgerlingen (DE); Peter Fritz, Sindelfingen (DE)

(73) Assignees: thyssenkrupp AG, Essen (DE); ThyssenKrupp Bilstein GmbH, Ennepetal (DE)

( * ) Notice: Subject to any disclaimer, the term of this patent is extended or adjusted under 35 U.S.C. 154(b) by 502 days.

(21) Appl. No.: 16/832,247

(22) Filed: Mar. 27, 2020

(65) Prior Publication Data

US 2020/0307336 A1 Oct. 1, 2020

(30) Foreign Application Priority Data

Mar. 28, 2019 (DE) .......................... 102019108057.6

(51) Int. Cl.
*B60G 13/06* (2006.01)
*F16F 9/06* (2006.01)
(Continued)

(52) U.S. Cl.
CPC .............. *B60G 13/06* (2013.01); *F16F 9/062* (2013.01); *F16F 9/064* (2013.01); *F16F 9/32* (2013.01);
(Continued)

(58) Field of Classification Search
CPC ................ B60G 13/06; B60G 2202/24; B60G 2206/41; F16F 9/062; F16F 9/064; F16F 9/32; F16F 9/369; F16F 2222/12
See application file for complete search history.

(56) References Cited

U.S. PATENT DOCUMENTS 2,802,664 A * 8/1957 Jackson .................. F16F 9/092
267/64.19
3,132,725 A * 5/1964 Zeidler ................. F16F 9/3214
188/320

(Continued)

FOREIGN PATENT DOCUMENTS

CN 103057508 4/2013
DE 35 1 6 751 A1 11/1985
(Continued)

*Primary Examiner* — Robert A. Siconolfi
*Assistant Examiner* — James K Hsiao
(74) *Attorney, Agent, or Firm* — Hamre, Schumann, Mueller & Larson, P.C.

(57) ABSTRACT

The invention relates to a vibration damper for a motor vehicle comprising an inner tube, an outer tube and at least one compensating chamber, which is formed between the inner tube and the outer tube and comprises at least one gas bag, which is arranged in the compensating chamber, wherein the compensating chamber is fluidically connected to at least one working area of the inner tube filled with a hydraulic fluid, wherein at least one guide element is provided, which deflects a flow of the hydraulic fluid during a rebound stage or a compression stage in such a way that the gas bag is indirectly subjected to flow. Furthermore, the invention relates to a motor vehicle.

6 Claims, 6 Drawing Sheets

Figure 1:
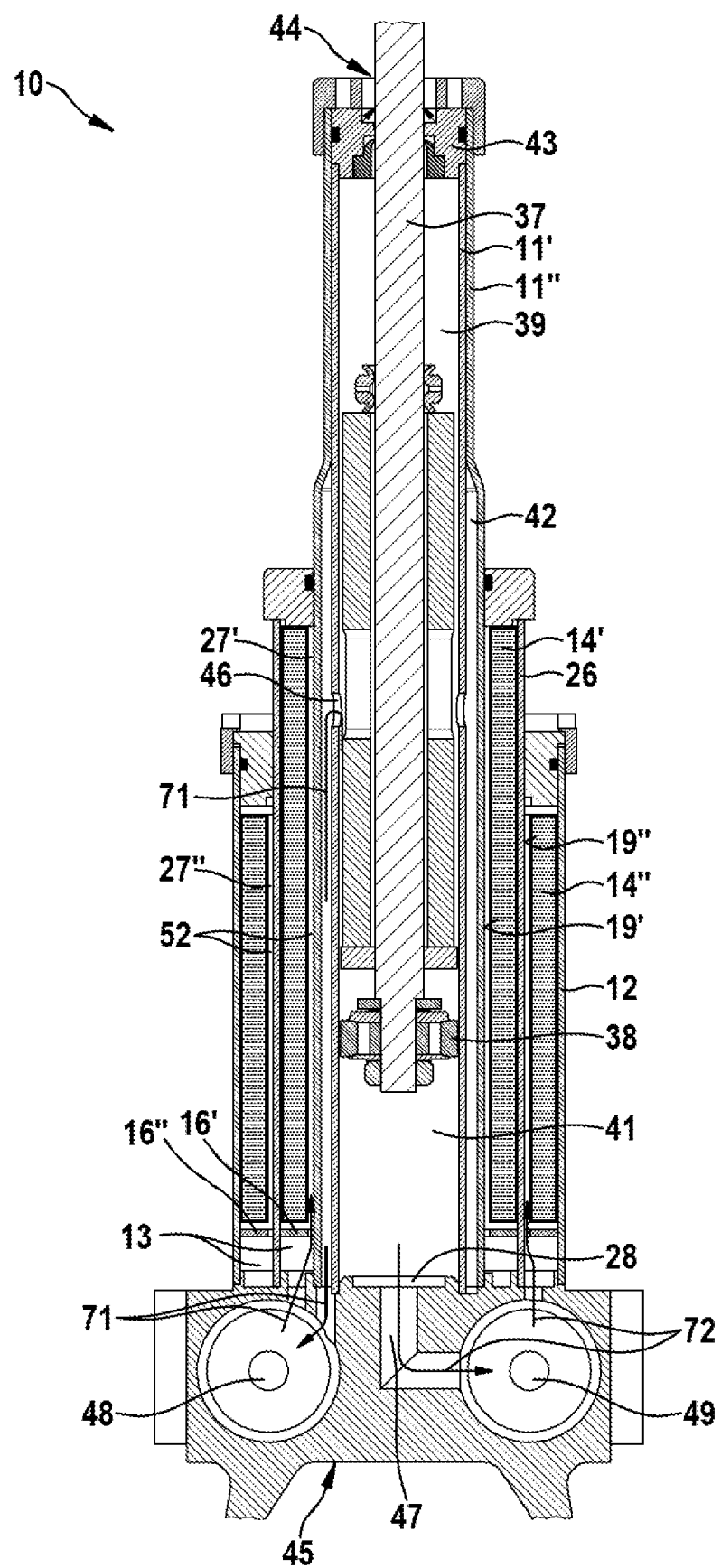

(51) Int. Cl.
*F16F 9/36* (2006.01)
*F16F 9/32* (2006.01)

(52) U.S. Cl.
CPC .......... *F16F 9/369* (2013.01); *B60G 2202/24* (2013.01); *B60G 2206/41* (2013.01); *F16F 2222/12* (2013.01)

(56) References Cited

U.S. PATENT DOCUMENTS

| | | | | |
|---|---|---|---|---|
| 3,194,547 A | | 7/1965 | Avner | |
| 3,331,601 A | * | 7/1967 | Riehl | F16F 9/092 267/64.19 |
| 3,387,856 A | * | 6/1968 | Mounier-Poulat | G03G 15/09 267/64.19 |
| 3,536,312 A | * | 10/1970 | Lohr | B60G 17/044 267/64.19 |
| 3,547,465 A | * | 12/1970 | Hans-Juergen | F16F 9/092 267/64.19 |
| 3,720,405 A | * | 3/1973 | Lohr | F16F 9/092 267/64.19 |
| 3,798,744 A | * | 3/1974 | Smith | F16F 9/43 267/64.23 |
| 3,799,528 A | * | 3/1974 | Allinquant | B60G 17/044 267/64.17 |
| 3,837,444 A | * | 9/1974 | Allinquant | F16F 9/092 188/269 |
| 3,844,543 A | * | 10/1974 | Whelan | B60G 15/12 267/64.19 |
| 3,874,485 A | * | 4/1975 | Smith | F16F 9/43 188/315 |
| 4,438,834 A | * | 3/1984 | Handke | F16F 9/364 188/315 |
| 4,702,356 A | | 10/1987 | Katz et al. | |
| 4,742,898 A | * | 5/1988 | Lee | F16F 9/48 188/315 |
| 4,877,223 A | * | 10/1989 | Hackett | B60G 17/044 267/64.18 |
| 4,993,693 A | * | 2/1991 | Lohr | B60G 17/044 267/64.17 |
| 5,441,303 A | * | 8/1995 | Rozanski | B60R 21/30 280/739 |
| 5,464,079 A | * | 11/1995 | Lohberg | F16F 9/465 188/315 |
| 5,564,680 A | * | 10/1996 | Sano | B60G 13/06 267/64.17 |
| 5,833,036 A | * | 11/1998 | Gillespie | F16F 1/042 188/315 |
| 9,855,812 B2 | * | 1/2018 | Galasso | F16F 9/16 |
| 10,400,843 B2 | * | 9/2019 | Yoshida | F16F 9/585 |
| 2010/0326780 A1 | * | 12/2010 | Murakami | F16F 9/446 188/322.19 |
| 2013/0099469 A1 | | 4/2013 | Rick | |
| 2019/0226548 A1 | * | 7/2019 | Miwa | F16F 9/3235 |

FOREIGN PATENT DOCUMENTS

| | | |
|---|---|---|
| DE | 101 04 358 C1 | 10/2002 |
| DE | 103 20 005 B3 | 10/2004 |
| DE | 10 2006 025 826 A1 | 2/2007 |
| DE | 10 2007 020 136 C1 | 10/2008 |
| DE | 10 2015 218 296 A1 | 3/2016 |
| DE | 10 2015 205 447 A1 | 9/2016 |

\* cited by examiner

VIBRATION DAMPER AND MOTOR VEHICLE

The invention relates to a vibration damper and a motor vehicle. A vibration damper in accordance with the preamble of Patent claim 1 is known, for example, from DE 10 2015 218 296 A1.

Vibration dampers are commonly used for motor vehicles, sports vehicles and industrial sectors. In the case of vibration dampers, a distinction is generally made between mono-tube dampers, twin-tube dampers and multi-tube dampers.

From the above-mentioned DE 10 2015 218 296 A1, for example, a vibration damper is known, which is designed as a multi-tube damper. The vibration damper comprises a working cylinder in which a piston rod can be moveably guided axially with a piston. Furthermore, the vibration damper comprises two annular spaces, in each of which a gas bag filled with gas is arranged. During operation or during a rebound stage or a compression stage, a damper medium flows out of the working area of the working cylinder into one of the annular spaces, whereby the respective gas bag is compressed.

Conventional gas bags are mainly made of a thin composite film. Such gas bags represent a weakness in the vibration damper. Particularly in the area of the flow inlet of the damper medium into the annular space, undesirable damage of the gas bag can result since this is often exposed to a direct flow stream of the damper medium. This increases the risk of failure of the vibration damper. In order to prevent a direct flow of the gas bag, the distance between the flow inlet and the gas bag is often increased or the gas bag is omitted in this area. This has the disadvantage that such gas bags have a reduced gas bag volume.

The object of the invention is to indicate a vibration damper, which, by means of an improved constructive embodiment, has an increased level of operational reliability as well as an increased service life. Furthermore, the object of the invention is to indicate a motor vehicle.

According to the invention, with regard to the vibration damper, this task is achieved by means of the object of claim 1.

The invention is based on the idea of indicating a vibration damper for a motor vehicle. The vibration damper comprises an inner tube, an outer tube and at least one compensating chamber, which is formed between the inner tube and the outer tube. Furthermore, the vibration damper has at least one gas bag, which is arranged in the compensating chamber. The compensating chamber is fluidically connected to at least one working area of the inner tube filled with a hydraulic fluid, wherein at least one guide element is provided which distracts a flow of the hydraulic fluid during a rebound stage or a compression stage in such a way that the gas bag is indirectly subjected to flow.

The invention has various advantages. The fluidic connection allows the hydraulic fluid to flow bidirectionally between the compensating chamber and the working area during a rebound stage or a compression stage of the vibration damper. In the case of a fully active damper, the hydraulic fluid can thus be favourably conveyed between the working area and the compensating chamber, for example, by means of a motor-pump unit. Thereby, a pressure difference can be generated within the vibration damper, by means of which an active damping force for the rebound stage or compression stage is built up.

The gas bag is filled with a compressible gas. The gas bag has the advantage that the gas is separated from the hydraulic fluid. In the case of a rebound stage or a compression stage, no foaming of the gas can occur with the hydraulic fluid, thereby increasing operational safety or reducing the risk of failure of the vibration damper.

The guide element deflects the hydraulic fluid entering the compensating chamber during the rebound stage or compression stage so that the gas bag is indirectly subject to flow, in particular, not being subjected to a direct flow. In other words, the guide element during the rebound stage or compression stage deflects the flow of the hydraulic fluid so that the hydraulic fluid flows indirectly to the gas bag. This favourably prevents a direct flow of the gas bag and thus prevents damage to the gas bag. In other words, the guide element protects the gas bag from the direct flow stream of the hydraulic fluid. Furthermore, this also increases an operational safety and a service life of the vibration damper. Furthermore, it is favourable that the gas bag is can be arranged at a very small distance to the guide element, whereby an enlarged gas volume of the gas bag is made possible.

Preferred embodiments of the invention are indicated in the subclaims.

In a particularly preferred embodiment, the guide element is arranged in the flow direction between the gas bag and the at least one working area of the inner tube. This has the advantage that, during a rebound stage or a compression stage, the hydraulic fluid must pass by the guide element in order to reach the compensating chamber or the gas bag. This prevents a direct flow of the gas bag, whereby the vibration damper has an increased operating safety and service life.

In another particularly preferred embodiment, the guide element is arranged in the compensating chamber between a longitudinal end of the gas bag and an inlet opening for the hydraulic fluid. The longitudinal end forms an axial end of the gas bag. The guide element can deflect the hydraulic fluid directly at and/or downstream from the inlet opening. The gas bag can be favourably arranged adjacent to the guide element, whereby the gas bag is better protected from the incoming hydraulic fluid. Furthermore, it is favourable that from the arrangement of the guide element in the compensating chamber results a compact construction.

In a preferred embodiment, the guide element is formed in such a way that the hydraulic fluid is guided between the gas bag and at least one tube wall during a rebound stage or a compression stage, in particular, during operation. In other words, the guide element guides the hydraulic fluid at the longitudinal end of the gas bag in such a way that the hydraulic fluid flows between the gas bag and the tube wall. The gas bag can have a plurality of flow areas that are formed at an inner circumference and/or an outer circumference of the gas bag. The guide element can guide the hydraulic fluid during a rebound stage or a compression stage to a radially arranged inside tube wall and/or to a radially externally arranged tube wall, in particular, thereby deflecting it. The guide element can be formed in such a way that the hydraulic fluid is evenly distributed over the circumference of the gas bag during a rebound stage or compression stage. Here, it is favourable for the hydraulic fluid to be guided past the axial end or longitudinal end of the gas bag, thereby being protected from being subjected to direct flow.

In a further preferred embodiment, the guide element in the cross-section has at least one guide limb, which guides the hydraulic fluid to the tube wall during a rebound stage or a compression stage. In other words, the hydraulic fluid is guided by the guide limb to the tube wall when flowing into the compensating chamber. This favourably provides protection of the gas bag against a direct hydraulic fluid flow. This increases an operational reliability as well as a service life of the vibration damper.

Preferably, the guide element has at least one passage opening, in particular, a slit through which the hydraulic fluid flows past during a rebound stage at the longitudinal end of the gas bag. The guide element can have a plurality of passage openings that are evenly or unevenly distributed in the circumferential direction. The passage opening can be formed in the guide element in such a way that it terminates flush with an inner side with the tube wall. In other words, the tube wall can form an extension of the inside of the passage opening of the guide element. Here, it is favourable that the passage opening forms a bypass through which the hydraulic fluid of a compression stage or of a rebound stage flows by the axial end of the gas bag. This prevents direct flow of the gas bag, thereby increasing a service life.

Being furthermore preferred, the guide element comprises at least one oblong extension with a flow channel, in particular, a flue, which at least partially guides the hydraulic fluid along the gas bag. During a rebound stage or compression stage, the hydraulic fluid flows through the flow channel in the longitudinal direction along the gas bag. The flow channel can also only guide a partial flow of the hydraulic fluid along the gas bag. The extension can be U-shaped. The hydraulic fluid is favourably guided along the gas bag in a controlled manner through the flow channel.

In a preferred embodiment, the extension is arranged between two lateral, in particular, longitudinal ends of the gas bag. The extension preferably overlaps both lateral ends for protection against damage. Due to the overlapping of the lateral ends of the gas bag, these are stabilized and protected by the flow of the hydraulic fluid.

The gas bag preferably has a hollow cylindrical form. The gas bag can be radially open towards the outside in a circumferential area. Furthermore, the extension can serve as a spacer that keeps the at the lateral ends at a constant distance from one another. This has the advantage that the fluid flow of the hydraulic fluid on the tube wall can be maintained at a constant level.

The lateral ends of the gas bag run in an essentially normal manner with the longitudinal ends or axial ends of the gas bag, in particular, being perpendicular to them. The gas bag can respectively have an edge reinforcement at each of the lateral ends. The edge reinforcement can be formed by means of an excess plastic melt. Alternatively, the lateral ends of the gas bag can each be reinforced with at least one plastic element, in particular, plastic rods. In addition, the plastic element can be welded to the lateral end by means of induction welding and/or ultrasonic welding.

In a particularly preferred embodiment, at least one intermediate tube is arranged between the inner tube and the outer tube, which divides the compensating chamber into a first annular space and a second annular space. At least one first gas bag is arranged in the first annular space for the rebound stage and at least one second gas bag is arranged in the second annular space for the compression stage. During a rebound stage, the hydraulic fluid flows into the first annular space and compresses the first gas bag. During the compression stage, the hydraulic fluid flows into the second annular space and compresses the second gas bag. The hydraulic fluid can flow through at least one valve unit from the working area of the inner tube into the annular spaces. In the case of a fully active damper, the hydraulic fluid can be actively conveyed between the working area and the annular spaces by means of a motor-pump unit. This allows a pressure difference to be generated within the vibration damper, by means of which an active damping force for the rebound stage or compression stage is built up. The formation of two annular spaces makes it favourable to generate an active damping force since the annular spaces are each affected by a different fluid pressure.

In a preferred embodiment, the gas bags are each assigned a guide element to deflect the flow of the hydraulic fluid upstream from the gas bag during a rebound stage or a compression stage. In other words, during a rebound stage, a first guide element is arranged upstream from the first gas bag to deflect the flow of the hydraulic fluid. Furthermore, during a compression stage, a second guide element is arranged upstream from a second gas bag for deflecting the flow of the hydraulic fluid. Here it is favourable that due to the function separation and the associated component separation, the respective guide element is designed in a constructively simply manner. Furthermore, the separate guide elements can be favourably arranged with little constructive effort upstream from the respective gas bag.

In another preferred embodiment, the guide element is designed as a single part and deflects the flow of the hydraulic fluid during a rebound stage and a compression stage in such a way that both gas bags are indirectly subjected to flow. In other words, only one guide element is provided for the deflection of the flow of the hydraulic fluid for the rebound stage and the compression stage. Thereby, it is favourable that a reduction in the number of components reduces the total cost. Furthermore, production of guide element can be simplified due to the singe-part design.

Preferably, the guide element is arranged between the intermediate tube and a base element. Specifically, the guide element can be arranged between an end face of the intermediate tube and the base element. This has the advantage that the guide element is arranged at a small distance to the inlet opening of the hydraulic fluid, whereby the respective annular space is better utilized. The guide element can protrude into the first annular space and the second annular space to deflect the flow of the hydraulic fluid from the axial end of the gas bags. This favourably prevents the gas bag from being subjected to flow directly.

The guide element can comprise at least one first seal area facing the intermediate tube, and at least one second seal area facing the base element in order to seal the annular spaces against each other in a fluid-tight manner. In other words, the first seal area is provided for sealing the guide element against the intermediate tube and the second seal area is provided for sealing the guide element against the base element. By sealing the guide element against the intermediate tube and against the base element, the two adjacent annular spaces can be sealed against each other in a fluid-tight manner. The seal areas therefore favourably seal the annular spaces against each other. This has the advantage that, with an active damping, the pressures in the respective annular space are maintained without any loss, thereby rendering the damper to be better operable.

Being furthermore preferred, the intermediate tube has at least one face-side cutting edge, which, in the first seal area, at least partially cuts into the guide element to seal the annular spaces in a fluid-tight manner. The face-side cutting edge can be pressed into the guide element in the first seal area. In other words, the guide element in the first seal area can be plastically deformed by the cutting edge. By cutting the cutting edge into the guide element, the annular spaces are favourably sealed against each other in a fluid-tight manner via the first seal area. Furthermore, it is favourable that the sealing can be quickly and easily established by pressing the cutting edge into the guide element. In addition, no further sealing element is required, for example, an O-ring seal, which makes this type of sealing cost-effective.

Furthermore, the base element can have at least one circumferential groove, into which the guide element engages in the second seal area for sealing the annular spaces in a fluid-tight manner. The guide element can be plastically deformed by pressing into the circumferential groove in such a way that the annular spaces are sealed against each other in a fluid-tight manner. In this embodiment, it is favourable that no additional sealing element is required for sealing the annular spaces against each other. Preferably, the guide element in the second seal area can be plastically deformed by pressing or cutting the face-side cutting edge into the first seal area. This favourably allows for the fluid-tight connection in the seal areas of the guide element to be established in a single assembly step by pressing, whereby assembly effort is reduced and thus costs are saved.

In one embodiment, at least one weld seam is formed in the first seal area, which connects the guide element to the intermediate tube for sealing the annular spaces in a fluid-tight manner. The weld seam can be provided on the guide element in a circumferential manner. The welded connection between the guide element and the intermediate tube can be formed by means of laser welding. In other words, the weld seam can be formed by means of a laser weld. The root penetration can be between 0.5-0.8 mm. Here, it is favourable that the welded joint in the first seal area is easy and cost-effective to establish. Furthermore, the sealing or connection of the guide element to the intermediate tube can be implemented in existing manufacturing processes with little effort. In addition, it is favourable that the guide element is firmly fixed into position by means of the weld seam.

In a further embodiment, at least one sealing element, in particular an O-ring, is arranged in the second seal area, which seals the annular spaces against each other. As is described above, the second seal area of the guide element is facing the base element. The sealing element can seal the guide element against the base element in a fluid-tight manner. This has the advantage that the annular spaces are sealed against each other in the second seal area in a simple and cost-effective manner.

In a preferred embodiment, the base element has at least one cutting edge, which at least partially cuts into the guide element in the second seal area to seal the annular spaces in a fluid-tight manner. The base element can have at least one extension, at which the cutting edge is arranged on the end face. The extension can extend in the longitudinal direction of the vibration damper or of the intermediate tube. The cutting edge can be pressed into the guide element in the second seal area. In other words, the guide element in the second seal area can be plastically deformed by the cutting edge. By cutting the cutting edge into the guide element, the annular spaces are favourably sealed against each other in a fluid-tight manner via the second seal area. Furthermore, it is favourable that the seal can be established quickly and easily by pressing the cutting edge into the guide element. In addition, no further sealing element, for example, an O-ring seal, is required.

Preferably, the guide element is connected to the intermediate tube and the base element in a metal-sealing manner. In other words, the intermediate tube and the base element interact with the guide element in such a way that the guide element is connected to the intermediate tube and the base element in a metal-sealing manner. This has the advantage that no additional sealing elements are required to seal the guide element against the intermediate tube and the base element. The annular spaces are thus favourably sealed against each other in a simple and cost-effective way.

The guide element can be formed by a weldable turned part, a weldable cold-extruded part, an aluminium turned part or an aluminium die-cast part. The guide element can be rotationally symmetric.

An ancillary aspect of the invention relates to a motor vehicle with at least one vibration damper according to the invention. Thereby, reference is made to the advantages explained in connection with the vibration damper. In addition, in addition or as an alternative, the motor vehicle can have individual or a combination of a plurality of features previously mentioned with reference to the motor vehicle.

The invention is explained in more detail below with reference to the attached drawings. The embodiments shown represent examples of how the vibration damper according to the invention can be designed.

Figure 2:
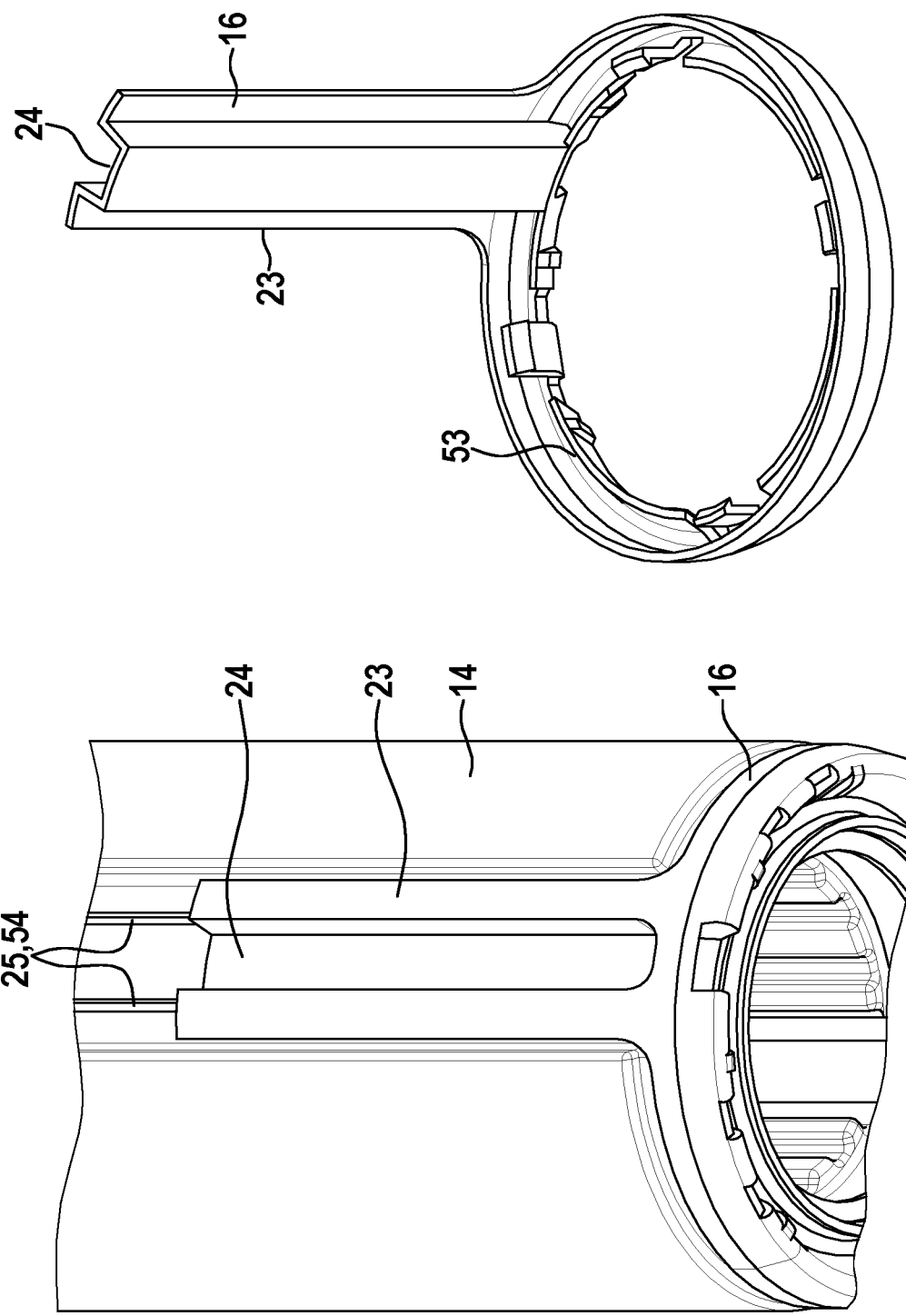
Figure 3:
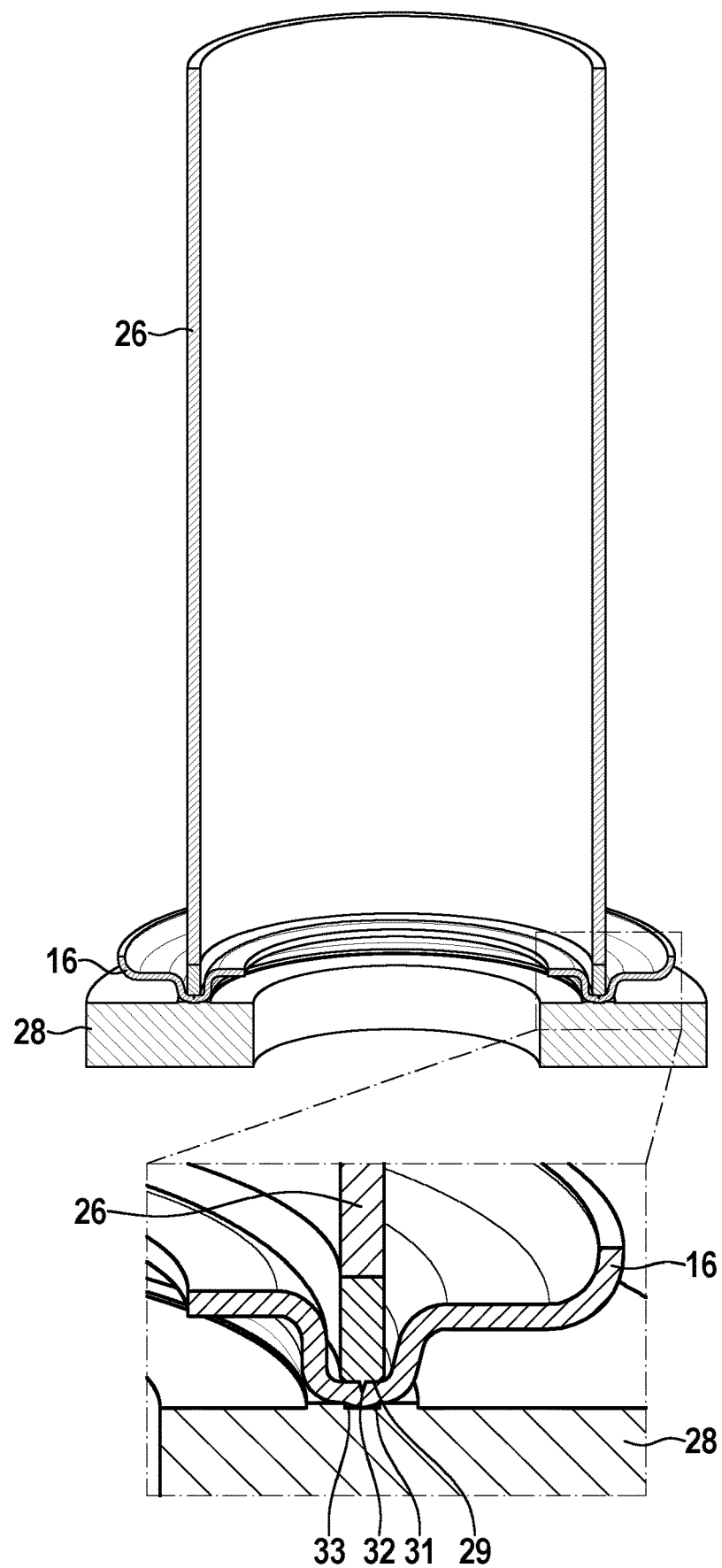
Figure 4:
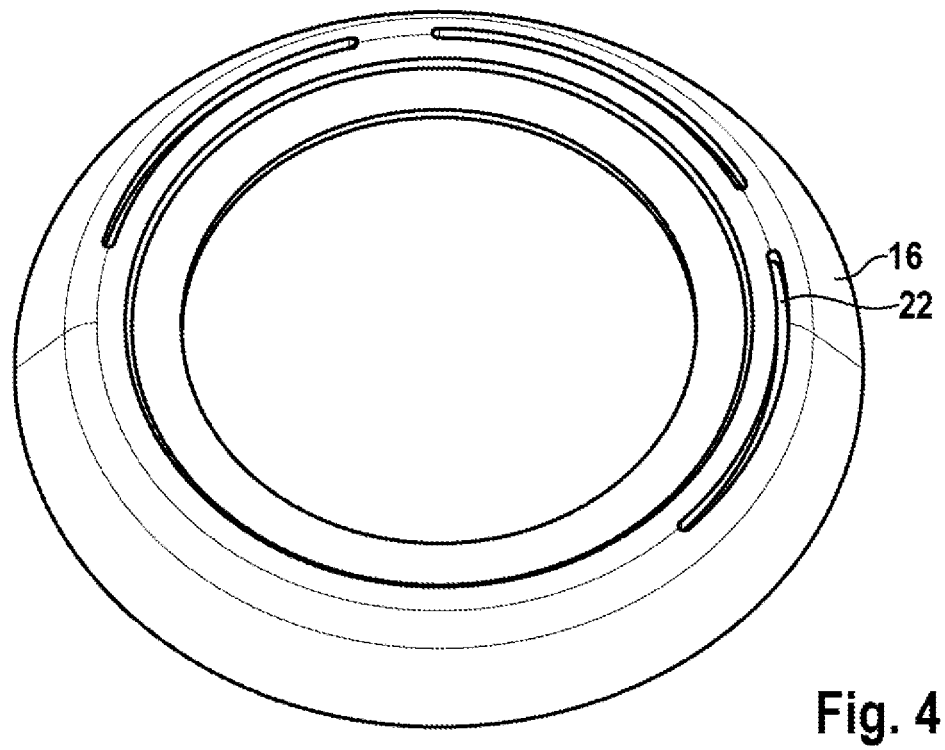
Figure 5:
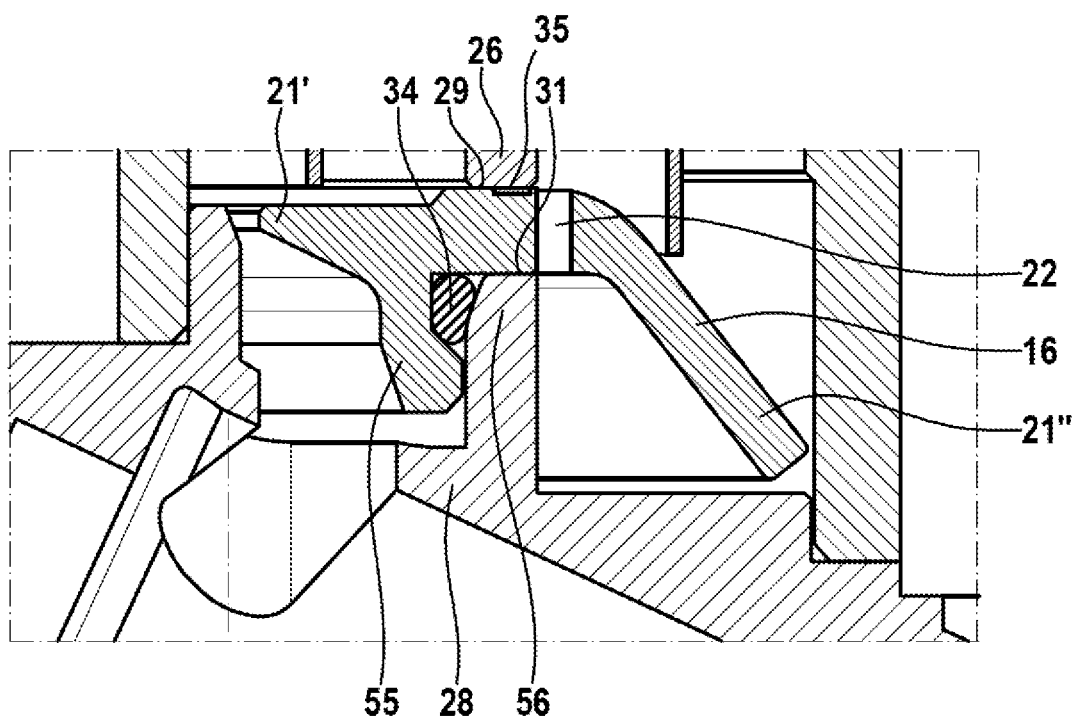
Figure 6:
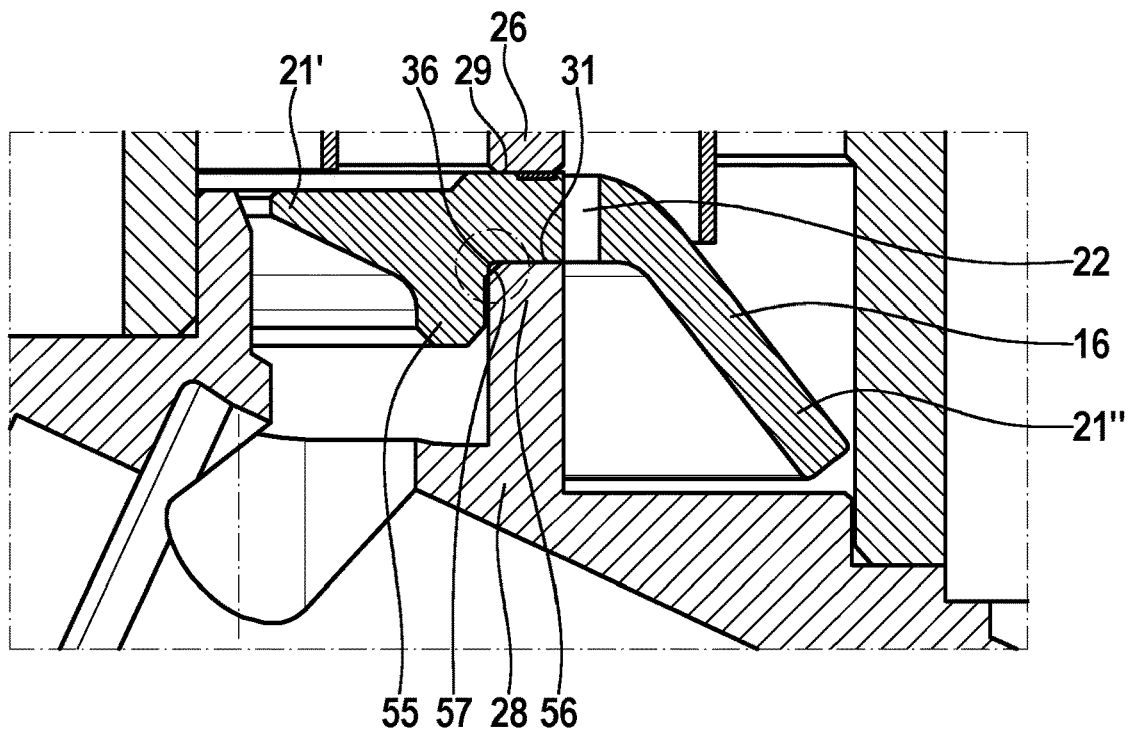
Figure 7:
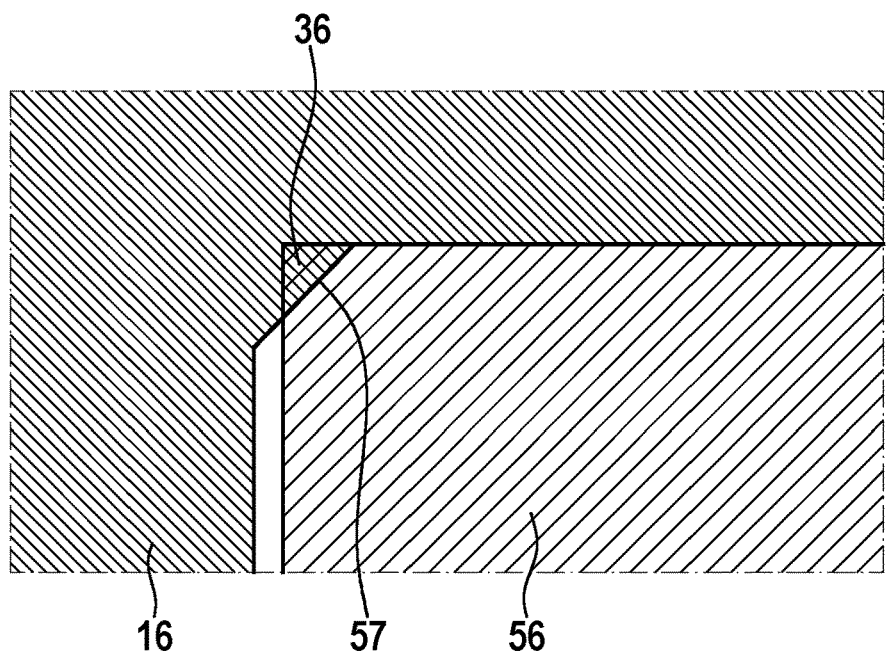
Figure 8:
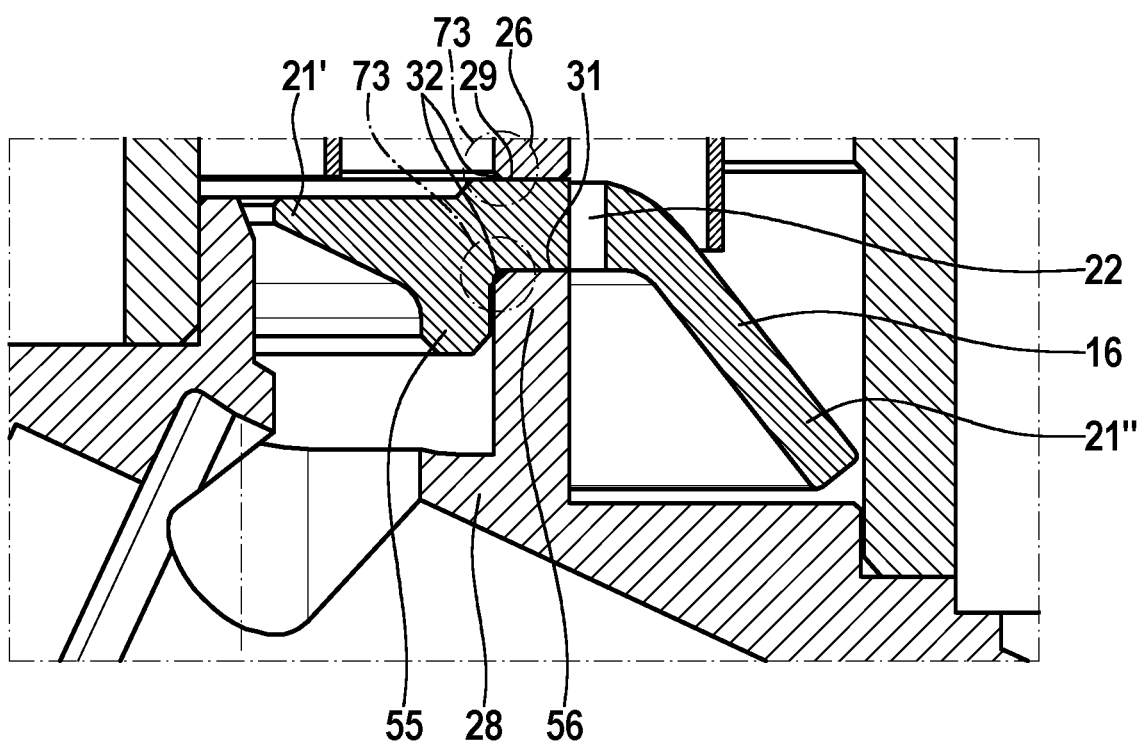

The figures show:

FIG. 1 a longitudinal view of a vibration damper in accordance with a preferred exemplary embodiment according to the invention;

FIG. 2 a perspective view of a vibration damper in accordance with another exemplary embodiment according to the invention, wherein a guide element is shown in an installed and a non-installed state;

FIG. 3 a perspective partial view of a vibration damper in accordance with another exemplary embodiment according to the invention with a guide element in the installed state;

FIG. 4 a perspective top view of a guide element,

FIG. 5 a detailed section of a longitudinal view of a vibration damper in accordance with another exemplary embodiment according to the invention;

FIG. 6 a detailed section of a longitudinal view of a vibration damper in accordance with another exemplary embodiment according to the invention;

FIG. 7 a detail of the view of the vibration damper in accordance with FIG. 6;

FIG. 8 a detailed section of a longitudinal view of a vibration damper in accordance with another exemplary embodiment according to the invention.

FIG. 1 shows a longitudinal view of a vibration damper 10 for a motor vehicle in accordance with a preferred exemplary embodiment according to the invention. The vibration damper 10 comprises a first inner tube 11', a second inner tube 11", an intermediate tube 26 and an outer tube 12. The tubes 11', 11", 12, 26 are arranged coaxially. Furthermore, the vibration damper 10 comprises a piston rod 37 with a piston 38, which is moveably guided in the first inner tube 11' in the longitudinal direction of the vibration damper 10. The piston 38 comprises at least two valve units for the rebound stage and the compression stage. Furthermore, the piston 38 divides the interior space of the first inner tube 11' into a first working area 39 and a second working area 41. In accordance with FIG. 1, the first working area 39 is shown arranged above and the second working area 41 is shown arranged below.

As described above, the tubes 11', 11", 12, 26 are coaxially arranged. The first inner tube 11' is arranged in the second inner tube 11". Between the first and the second inner tube 11', 11", a ring-shaped intermediate space 42 is formed, which is fluidically connected to the first working area 39. The intermediate space 42 is an extension of the first working area 39. The intermediate space 42 is partially formed in the longitudinal direction of the vibration damper 10. In other words, the intermediate space 42 is formed across a partial length of the inner tubes 11', 11".

The inner tubes 11', 11" are both arranged in the intermediate tube 26, wherein the intermediate tube 26 in the outer tube 12 is arranged. In other words, the intermediate tube 26 is arranged between the second inner tube 11" and the outer tube 12. The intermediate tube 26 divides a compensating chamber 13 into two annular spaces 27', 27", wherein the compensating chamber 13 between the second inner tube 11" and the outer tube 12 is provided. In summary, the first inner tube 11', the second inner tube 11", the intermediate tube 26 and the outer tube 12 are provided transversely to the longitudinal direction of the vibration damper 10 seen from the inside to the outside.

A first annular space 27' is formed between the second inner tube 11" and the intermediate tube 26. Furthermore, a second annular space 27" is formed between the intermediate tube 26 and the outer tube 12. A first gas bag 14' is arranged in the first annular space 27' for the rebound stage and a second gas bag 14" is arranged in the second annular space 27" for the compression stage. The working areas 39, 41, the intermediate space 42 and the two annular spaces 27, 27" are filled with a hydraulic fluid e.g. a damper oil. Furthermore, the gas bags 14', 14" are filled with a damper gas, for example, nitrogen.

The vibration damper 10 also includes a sealing pack 43 and a base element 28. The sealing pack 43 seals the inner tubes 11', 11" at a piston rod facing end 44 of the vibration damper 10 in a fluid-tight manner. The piston rod 37 is arranged in the sealing pack 43 in an axially guided manner. During a rebound stage or compression stage, the piston rod 37 moves in or out through the sealing pack 43 from the first inner tube 11'. The base element 28 seals all four tubes 11', 11", 12, 26 at a piston rod-away end 45 of the vibration damper 10 in a fluid-tight manner.

The base element 45 comprises a first fluid channel 46 and a second fluid channel 47, which fluidically connect the interior space of the first inner tube 11' to the annular spaces 27', 27". Specifically, the first working area 39 is fluidically connected to the first annular space 27' via the intermediate space 42, the first fluid channel 46 and a rebound stage valve 48. The base element 28 has an unrepresented inlet opening, which fluidically connects the rebound stage valve 48 to the first annular space 27'. Furthermore, the second working area 41 is fluidically connected via the second fluid channel 47, a compression stage valve 49 and a second inlet opening 51 to the second annular space 27".

In accordance with FIG. 1, the vibration damper 10 comprises two guide elements 16, wherein a first guide element 16' is arranged in the first annular space 27' and a second guide element 16" is arranged in the second annular space 27". The guide elements 16', 16" deflect the flow or the flow stream of the hydraulic fluid during a rebound stage or a compression stage in such a way that the respective gas bag 14', 14" is indirectly subjected to flow. In other words, the guide elements 16', 16" deflect the flow stream of the hydraulic fluid in such a way that the hydraulic fluid is indirectly introduced to the gas bags 14', 14". The guide elements 16', 16" thus favourably prevent a direct flow of the gas bags 14', 14" whereby their service life is increased. The guide elements 16 are rotationally symmetric. It is conceivable that the guide elements 16 also have a different form from a rotationally symmetric form.

As can be recognized in FIG. 1, the guide elements 16', 16" are arranged in the annular spaces 27', 27" in the flow direction upstream from the respective gas bag 14', 14". Concretely, the first guide element 16' in the first annular space 27' is arranged in the flow direction before the first gas bag 14'. Further, the second guide element 16" in the second annular space 27" is arranged in the flow direction upstream from the second gas bag 14". The respective guide element 16', 16" is arranged between the longitudinal end 17, in particular axial end, the respective gas bag 14', 14" and the respective inlet opening of the base element 28.

The guide elements 16', 16" are designed in such a way that the hydraulic fluid is guided between the respective gas bag 14', 14" and a tube wall 19 during a rebound stage or a compression stage. Between the guide elements 16', 16" and the respective tube wall 19, at least one slit 52 is formed, through which the hydraulic fluid flows during operation. The slit 52 can be fully circumferential. The slit 52 can also be formed in sections. It is also conceivable that the guide element 16', 16" has at least one flow opening for the hydraulic fluid. The guide elements 16', 16" each have a guide limb 21, which guides the hydraulic fluid to the tube wall 19 during a rebound stage or a compression stage. The guide limb 21 will be discussed in more detail later.

In accordance with FIG. 1, the hydraulic fluid is guided to an outer tube wall 19' of the second inner tube 11" during a rebound stage. It is also conceivable that the hydraulic fluid is guided to an inner tube wall of the intermediate tube 26 during a rebound stage. The flow stream of the hydraulic fluid is passed by the longitudinal end 17 of the first gas bag 14' so that the hydraulic fluid flows along the gas bag 14' between the circumference of the first gas bag 14' and the outer tube wall 19'. The progressive course of the flow stream is shown by the arrow 71.

During a compression stage, the hydraulic fluid is guided to an outer tube wall 19" of the intermediate tube 26. It is also conceivable that the hydraulic fluid is guided to an inner tube wall of the outer tube 12 during a compression stage. The flow stream of the hydraulic fluid is passed by the longitudinal end 17 of the second gas bag 14" so that the hydraulic fluid flows along the gas bag 14" between the circumference of the second gas bag 14" and the outer tube wall 19"'. The progressive course of the flow stream is shown by the arrow 72.

FIG. 2 shows a guide element 16 of a vibration damper according to another exemplary embodiment according to the invention. In the left diagram, the guide element 16 is shown in the installed state and in the right representation in the non-installed state.

In addition to the embodiments of the guide elements 16', 16" mentioned in FIG. 1, the guide element 16 in accordance with FIG. 2 comprises, an oblong extension 23 with a flow channel 24. The oblong extension 23 forms a flue, which partially guides the hydraulic fluid along the respective gas bag 14', 14". During a rebound stage or compression stage, the hydraulic fluid flows through the flow channel 24 of the extension 23 in the longitudinal direction along the gas bag 14', 14". At the same time, a partial flow of the hydraulic fluid flows radially between the gas bag 14', 14" and the one in FIG. 1 described outer tube wall 19', 19" along the gas bag 14', 14".

In accordance with FIG. 2, the oblong extension 23 is essentially U-shaped. The oblong extension 23 is arranged between two lateral ends 25 of the gas bag 14', 14", in particular longitudinally running ones. The extension 23 overlaps both lateral ends 25 for protection against damage. Due to the overlapping of the lateral ends 25 of the gas bag 14', 14", these are stabilized and protected from the flow of the hydraulic fluid. The guide element 16 also comprises a circumferential bag 53, into which the gas bag 14', 14" engages with its longitudinal end 17.

As can be recognized in FIG. 2, the gas bag 14', 14" has a hollow cylindrical shape. The gas bag 14', 14" is radially open towards the outside in a circumferential area. The oblong extension 23 additionally serves as a spacer, which keeps the two lateral ends 25 at a constant distance from each other.

The lateral ends 25 of the gas bag 14', 14" run essentially normally with the longitudinal ends 17 or axial ends of the gas bag 14', 14", in particular, being perpendicular to them. The gas bag 14', 14" respectively has an edge reinforcement 54 at each of its lateral ends 25. The edge reinforcement 54 can be formed by means of an excess plastic melt. Alternatively, the lateral ends 25 of the gas bag 14', 14" can each be reinforced with at least one plastic element, in particular, plastic rods. The plastic element can be welded to the lateral end 25 by induction welding and/or ultrasonic welding.

In accordance with FIG. 3 a vibration damper 10 in accordance with another exemplary embodiment according to the invention is shown, wherein for better understanding, only an intermediate tube 26, a base element 28 and a guide element 16 are shown. In contrast to the vibration damper in accordance with the FIGS. 1 to 3, only one single guide element 16 is provided for the flow distribution for the rebound stage and the compression stage in the case of the vibration damper 10 in accordance with FIG. 4. The guide element 16 dissipates the flow of the hydraulic fluid during a rebound stage and a compression stage in such a way that both gas bags 14', 14" are indirectly subjected to flow. The guide element 16 is schematically shown in the illustrations of FIG. 3.

As in the detail view in accordance with FIG. 3 (right representation) is shown, the guide element 16 is arranged between the intermediate tube 26 and a base element 28. Specifically, the guide element 16 is arranged between an end face of the intermediate tube 26 and the base element 28. The guide element 16 protrudes into the first annular space 27' and the second annular space 27" to deflect the flow of the hydraulic fluid from the longitudinal end 17, in particular, axial end, of the gas bag 14', 14". The guide element 16 is U-shaped and has two guide limbs 21. The guide limbs 21 are spaced from the base element 28 and thus from the not shown inlet openings.

In accordance with the guide element 16, as is shown in FIG. 3, the hydraulic fluid is guided to an outer tube wall of the second inner tube 11" (not shown) during a rebound stage. It is also conceivable that the hydraulic fluid is guided to an inner tube wall of the intermediate tube 26 during a rebound stage. The flow stream of the hydraulic fluid is passed by the longitudinal end 17 of the first gas bag 14' (not shown) so that the hydraulic fluid flows between the circumference of the first gas bag 14' and the outer tube wall along the gas bag 14'.

During a compression stage, the hydraulic fluid is guided to an inner tube wall of the outer tube 12 (not shown). It is also conceivable that the hydraulic fluid is guided to an outer tube wall of the intermediate tube 26 during a compression stage. The flow stream of the hydraulic fluid is passed by the longitudinal end 17 of the second gas bag 14" (not shown) so that the hydraulic fluid flows between the circumference of the second gas bag 14" and the inner tube wall along the gas bag 14".

The guide element 16 in accordance with FIG. 3 comprises a first seal area 29 facing the intermediate tube 26 and a second seal area 31 facing the base element 28 in order to seal the annular spaces 27', 27" against each other in a fluid-tight manner. Specifically, the first seal area 29 is provided for sealing the guide element 16 against the intermediate tube 26 and the second seal area 31 is provided for sealing the guide element 16 against to the base element 28.

In accordance with FIG. 3, the intermediate tube 26 has a face-side cutting edge 32, which cuts into the guide element 16 in the first seal area 29 for sealing the annular spaces 27', 27" in a fluid-tight manner. The intermediate tube 26 can also have a plurality of face-side cutting edges. The face-side cutting edge 32 is pressed into the guide element 16 in the first seal area 29. In other words, the guide element 16 is plastically deformed by the cutting edge 32 in the first seal area 29.

Furthermore, the base element 28 in accordance with FIG. 3 comprises a circumferential groove 33, into which the guide element 16 engages in the second seal area 31 to seal the annular spaces 27', 27" in a fluid-tight manner. The guide element 16 is plastically deformed by pressing into the circumferential groove 33 in such a way that the annular spaces 27', 27" are fluid-tightly sealed against each other. In the first seal area 29, a circumferential sealing edge is formed by the cutting edge 32. Furthermore, two circumferential sealing edges are formed by the circumferential groove 33. The guide element 16 works together with the intermediate tube 26 and the base element 28 in a metal-sealing manner. The guide element 16 can be designed as an aluminium turned part or as an aluminium die-cast part.

FIG. 4 shows a perspective top view of a guide element 16 as it is used in the vibration dampers 10 in accordance with FIGS. 5 to 8. The guide element 16 has a rotationally symmetrical shape. The guide element 16 has a plurality of passage openings 22, by means of which the hydraulic fluid flows by the longitudinal end 17 of the gas bag 14" during a rebound stage. The passage openings 22 are each formed by a slit. The passage openings 22 can also be formed by holes. The passage openings 22 are formed in an unevenly distributed manner in the circumferential direction. It is also conceivable that the passage openings 22 are evenly distributed in the circumferential direction.

In accordance with FIG. 5, the guide element 16, as has already been described in FIG. 3, is arranged between the intermediate tube 26 and the base element 28. In contrast to the vibration damper 10 in accordance with FIG. 3, the guide element 16 in accordance with FIG. 5 is welded to the intermediate tube 26 in the first seal area 29. Specifically, a weld seam is formed between the guide element 16 and the end face of the intermediate tube 26, which connects the guide element 16 to the intermediate tube 26 to seal the annular spaces 27', 27" in a fluid-tight manner. The weld seam can be formed by means of laser welding. The root penetration of the weld seam can be from 0.5-0.8 mm. The guide element 16 is made of a weldable material. The guide element 16 can be formed as a turning part, in particular, from S355 (material number). It is also conceivable that the guide element 16 is designed as a cold-extruded part.

As is evident in FIG. 5, the guide element 16 has a nib 55 in the second seal area 31, at which a sealing element 34 is arranged. The sealing element 34 is formed by an O-ring. The sealing element 34 is located at a projection 56 of the base element 28 so that the guide element 16 is sealed against the base element 28 in a fluid-tight manner.

In accordance with the FIGS. 5 to 8, the guide element 16 has two guide limbs 21, wherein a first guide limb 21' is arranged in the first annular space 27' and a second guide limb 21" is arranged in the second annular space 27". During a rebound stage, the first guide limb 21' together with the base element 28 guides the hydraulic fluid into the outer tube wall of the second inner tube 11" so that the flow stream is passed by the longitudinal end 17 of the first gas bag 14'. The second guide limb 21" guides the flow stream of the hydraulic fluid to the passage opening 22 during a compression stage in accordance with FIG. 4. The passage opening 22 is provided with an inner side flush with the outer tube wall of the intermediate tube 26. Through the passage opening 22, the hydraulic fluid flows past the longitudinal end 17 of the second gas bag 14".

In contrast to FIG. 5, a cutting edge seal is provided in the second seal area 31 instead of a sealing element in accordance with FIG. 6. Specifically, the guide element 16 on an inside of the nib 55 has a chamfer 57 and the projection 56 has a cutting edge 36, wherein the cutting edge 36 cuts into the chamfer 57. By cutting the cutting edge 36 of the projection 56 into the chamfer 57 of the guide element 16, a fluid-tight connection is established. This is marked in FIG. 6 by the circle 73. In FIG. 7, the cutting edge connection can be seen in detail. Hereby, the fluid-tight connection is established by the pressing in of the cutting edge 36 into the chamfer 57.

In accordance with FIG. 8, in contrast to FIG. 6, no weld seam is formed in the first seal area 29. The intermediate tube 26 in accordance with FIG. 8 has a cutting edge (not shown), which, in the first seal area 29, cuts into the guide element 16 to seal the annular spaces 27', 27". The intermediate tube 26 can also have several cutting edges. The cutting edge is pressed into the guide element 16 in the first seal area 29. In other words, the guide element 16 in the first seal area 29 is plastically deformed by the cutting edge 32 so that the annular spaces 27', 27" are sealed against each other. The cutting edge sealing in the first seal area 29 and in the second seal area 31 of the guide element 16 is characterized by the circles 73. In accordance with FIG. 8, the guide element 16 is connected to the intermediate tube 26 and the base element 28 in a metal-sealing manner. The guide element 16 can be designed as an aluminium turned part or as an aluminium die-cast part.

REFERENCE LIST 10 vibration damper
11, 11', 11" inner tube
12 outer tube
13 compensating chamber
14, 14', 14" gas bag
16, 16', 16" guide element
17 longitudinal end of the gas bag
18 inlet opening
19 tube wall
19', 19" outer tube wall
21 guide limb
22 passage opening
23 oblong extension
24 flow channel
25 lateral end
26 intermediate tube
27', 27" annular space
28 base element
29 first seal area
31 second seal area
32 face-side cutting edge
33 circumferential groove
34 sealing element
35 weld seam
36 cutting edge of the base element
37 piston rod
38 piston
39 first working area
41 second working area
42 intermediate space
43 sealing pack
44 end facing the piston rod
45 end facing away from the piston rod
46 first fluid channel
47 second fluid channel
48 valve unit for the rebound stage
49 valve unit for the compression stage
51 second inlet opening
52 slit
53 bag
54 edge reinforcement
55 nib
56 projection
57 chamfer
71 flow stream of the rebound stage
72 flow stream of the compression stage
73 circle

The invention claimed is:

1. A vibration damper for a motor vehicle comprising an inner tube, an outer tube and at least one compensating chamber formed between the inner tube and the outer tube and comprising at least one gas bag, which is arranged in the compensating chamber, wherein the compensating chamber is fluidically connected to at least one working area of the inner tube filled with a hydraulic fluid,
wherein at least one guide element is provided, which deflects a flow of the hydraulic fluid during a rebound stage or a compression stage in such a way that the gas bag is indirectly subjected to flow,
wherein at least one intermediate tube is arranged between the inner tube and the outer tube, which divides the at least one compensating chamber into a first annular space and a second annular space, wherein at least one first gas bag is arranged in the first annular space for the rebound stage, and at least one second gas bag is arranged in the second annular space for the compression stage and
wherein the at least one guide element is arranged between the at least one intermediate tube and a base element, wherein the at least one guide element comprises at least one first seal area facing the at least one intermediate tube and at least one second seal area facing the base element in order to seal the first annular space and the second annular space against each other in a fluid-tight manner.

2. The vibration damper according to claim 1, wherein the intermediate tube has at least one face-side edge configured to at least partially notch into the guide element in the first seal area to seal the first annular space and the second annular space in a fluid-tight manner.

3. The vibration damper according to claim 1, wherein the base element comprises at least one circumferential groove, into which the guide element engages in the second seal area for sealing the first annular space and the second annular space in a fluid-tight manner.

4. The vibration damper according to claim 1, wherein at least one weld seam is formed in the first seal area, which connects the guide element to the intermediate tube to seal the first annular space and the second annular space in a fluid-tight manner.

5. The vibration damper according to claim 1, wherein at least one sealing element, in particular an O-ring, is arranged in the second seal area which seals the first annular space and the second annular space against each other.

6. The vibration damper according to claim 1, wherein the base element has at least one edge configured to notch into the guide element in the second seal area to at least partially seal the first annular space and the second annular space in the fluid-tight manner.

* * * * *